(12) United States Patent
Fischer et al.

(10) Patent No.: US 8,434,456 B2
(45) Date of Patent: May 7, 2013

(54) METHOD AND DEVICE FOR OPERATING A COMBUSTION ENGINE

(75) Inventors: Wolfgang Fischer, Gerlingen (DE); Silke Seuling, Kornwestheim (DE)

(73) Assignee: Robert Bosch GmbH, Stuttgart (DE)

( * ) Notice: Subject to any disclaimer, the term of this patent is extended or adjusted under 35 U.S.C. 154(b) by 361 days.

(21) Appl. No.: 12/576,798

(22) Filed: Oct. 9, 2009

(65) Prior Publication Data

US 2010/0121555 A1 May 13, 2010

(30) Foreign Application Priority Data

Oct. 13, 2008 (DE) .......................... 10 2008 042 779
Jan. 20, 2009 (DE) .......................... 10 2009 000 329

(51) Int. Cl.
*F02M 7/00* (2006.01)
*F02B 5/00* (2006.01)

(52) U.S. Cl.
USPC ............................ 123/435; 123/305; 701/103

(58) Field of Classification Search .................. 123/435, 123/406.22, 305; 701/102, 114, 115; 73/114.16, 73/114.17, 114.18, 114.02, 114.03
See application file for complete search history.

(56) References Cited

U.S. PATENT DOCUMENTS

| | | | |
|---|---|---|---|
| 5,050,556 A * | 9/1991 | Williams et al. ......... | 123/406.28 |
| 5,738,074 A * | 4/1998 | Nakamura et al. ............ | 123/305 |
| 6,679,200 B2 * | 1/2004 | Dingle .......................... | 123/1 A |
| 6,775,623 B2 * | 8/2004 | Ali et al. ......................... | 702/31 |
| 6,805,099 B2 * | 10/2004 | Malaczynski et al. ........ | 123/435 |
| 6,981,488 B2 * | 1/2006 | Harris et al. .................. | 123/435 |
| 7,013,865 B2 * | 3/2006 | Nagai et al. .................... | 123/305 |
| 7,290,442 B2 * | 11/2007 | Zhu et al. ..................... | 73/114.67 |
| 7,322,341 B2 * | 1/2008 | Yamaguchi et al. .......... | 123/435 |
| 7,334,561 B2 * | 2/2008 | Neunteufl et al. ............ | 123/295 |
| 7,475,673 B1 * | 1/2009 | Fattic ............................ | 123/435 |
| 7,621,174 B2 * | 11/2009 | Takaku ....................... | 73/114.53 |
| 7,669,583 B2 * | 3/2010 | Moriya .................... | 123/406.22 |
| 7,673,618 B2 * | 3/2010 | Hasegawa et al. ............ | 123/435 |
| 7,779,679 B2 * | 8/2010 | Wang et al. ................. | 73/114.52 |
| 7,779,680 B2 * | 8/2010 | Sasaki et al. ............... | 73/114.71 |
| 7,822,529 B2 * | 10/2010 | Dagci et al. ................... | 701/102 |
| 7,894,975 B2 * | 2/2011 | Morimoto et al. ............ | 701/108 |
| 8,068,971 B2 * | 11/2011 | Hamedovic et al. .......... | 701/103 |
| 2003/0200955 A1 * | 10/2003 | zur Loye et al. .............. | 123/435 |
| 2004/0144082 A1 * | 7/2004 | Mianzo et al. .................. | 60/285 |
| 2006/0169243 A1 * | 8/2006 | Neunteufl et al. ............ | 123/295 |
| 2007/0079647 A1 * | 4/2007 | Aoyama ....................... | 73/35.02 |
| 2007/0084435 A1 * | 4/2007 | Yamaguchi et al. .......... | 123/299 |
| 2007/0119418 A1 * | 5/2007 | Kojima et al. ................. | 123/305 |
| 2008/0010973 A1 * | 1/2008 | Gimbres ......................... | 60/276 |
| 2008/0053405 A1 * | 3/2008 | Vigild et al. ............. | 123/406.26 |
| 2008/0140297 A1 * | 6/2008 | Neunteufl et al. ............ | 701/103 |
| 2008/0308067 A1 * | 12/2008 | Schuckert et al. ............ | 123/435 |
| 2009/0158831 A1 * | 6/2009 | Cornwell et al. .......... | 73/114.16 |

(Continued)

*Primary Examiner* — Thomas Moulis

(74) *Attorney, Agent, or Firm* — Kenyon & Kenyon LLP

(57) ABSTRACT

A method for setting a combustion in a combustion engine, particularly in a diesel engine, having the following steps of generating a manipulated variable, particularly a point of injection (PI), as a function of a combustion feature (MFB50%), the combustion feature (MFB50%) representing a condition in cylinder, especially a pressure characteristic in the cylinder, and setting the combustion in cylinders of the combustion engine with the aid of the manipulated variable, the manipulated variable further being generated as a function of a correction value (CV), which is determined as a function of combustion information ($dQ_{max}$) that provides an indication about the quality of the combustion.

18 Claims, 4 Drawing Sheets

U.S. PATENT DOCUMENTS

2009/0178388 A1* 7/2009 Schumacher et al. .......... 60/276
2009/0183551 A1* 7/2009 Fattic et al. .................. 73/23.31
2009/0223485 A1* 9/2009 Hamedovic et al. .......... 123/435
2009/0293842 A1* 12/2009 Akazaki et al. .......... 123/406.41

* cited by examiner

1

METHOD AND DEVICE FOR OPERATING A COMBUSTION ENGINE

FIELD OF THE INVENTION

The present invention relates to auto-ignition combustion engines, particularly a method and a device for operating diesel engines, especially for determining a point of injection for diesel engines.

BACKGROUND INFORMATION

To operate an auto-ignition combustion engine such as a diesel engine, for instance, a combustion-position control is carried out for new combustion processes, by which the points of injection of fuel into the cylinders are set. Such a control is based on pressure features ascertained in the combustion chamber, such as data about a combustion position or the indicated work, in particular, based on the combustion feature MFB50% (mass fraction burned) (MFBx %: crankshaft angle at which x % of the fuel injected in the cylinder is burned).

With the control of the combustion position, the combustion in the cylinders is suitably corrected as a function of the control deviation by at least an intervention with respect to the point of injection, in order to achieve a desired combustion which is determined by a setpoint value of the combustion feature. Since, in principle, such a control is only able to react after the control deviation has occurred, and the speed with which the controller can be applied must be limited for reasons of stability, the setting to the desired combustion is only possible with a delay which, according to experience, corresponds to several working cycles of the combustion engine.

In the case of new diesel combustion systems, which are implemented to reduce exhaust-gas emissions, such as LTC (Low Temperature Combustion), HCCI (Homogeneous Charge Compression Ignition), HCLI (Homogeneous Charge Late Ignition), generally very high exhaust-gas recirculation rates (EGR-rates) are provided. Given a corresponding engine system, the EGR-rate determines the portion of the quantity of combustion exhaust gas returned into an air-feed system relative to the total amount of the gas mixture directed into the cylinders.

Because of the high EGR rates used in the new diesel combustion systems, the combustion engine is operated closer to a stability limit, so that in response to an EGR-rate deviating slightly from the setpoint EGR-rate set, the risk of an unwanted operating state of the combustion engine develops. The exceeding of the optimal EGR-rate leads, in particular, to an increased risk of misfirings, and if there is a drop below the optimal EGR-rate, the noise generation during the combustion increases unacceptably. Especially during dynamic operation with respect to the speed and the load of the combustion engine, in which, because of the sluggishness of the air system, it is inherent in the system that the necessary EGR-rate is exceeded or not attained, this represents a challenge for the engine management.

Because of the delay described above, the conventional control of the air system is not able to continuously retain the relevant air-system variables, such as the EGR-rate, at the optimal value. A combustion control, and here especially the control of the combustion position to the steady setpoint value for the combustion position MFB50% in dynamic operation, is not practical due to the different state of the air system, since here a different setpoint value represents the optimum. Therefore, the dynamic operation of the combustion engine may be associated in particular either with too high a noise generation or with an increase in the risk of combustion misfirings.

In addition, the engine speed has an influence on the combustion, since, among other things, it influences the mixture preparation. Since, for stability reasons, the speeds with which the controls can be applied must be limited, in the case of longer deviations between setpoint and actual values, a not inconsiderable integration component may build up which may lead to misfirings in the event of rapid changes in the operating point and a rapid commencement of the exhaust-gas recirculation as a result.

Therefore, an object of the exemplary embodiments and/or exemplary methods of the present invention is to provide a method and a device with which it is possible to compensate for the effects of the deviation of the EGR-rate from the optimal EGR-rate, or in general, a deviation of the air-system variables from their setpoint values, particularly during dynamic operation of the combustion engine, as quickly as possible via the rapid control path of the fuel injection, and in particular, to minimize or rule out the occurrence of disadvantageous operating states because of the condition of the air mixture upstream of the intake valves, e.g., a drop below or exceeding of the EGR-rate and/or the mixture temperature.

SUMMARY OF THE INVENTION

This objective may be achieved by the method described herein and by the engine-control unit described herein.

Further advantageous embodiments of the present invention are described herein.

According to a first aspect, a method is provided for setting a combustion in a combustion engine, particularly in a diesel engine. The method includes the following steps:

Generating a manipulated variable, particularly a point of injection, as a function of a combustion feature, the combustion feature representing a condition in the cylinder, especially a pressure characteristic in the cylinder; and Setting the combustion in the cylinders of the combustion engine with the aid of the manipulated variable;

the manipulated variable further being generated as a function of a correction value, which is determined as a function of combustion information that provides an indication about the quality of the combustion.

Furthermore, the manipulated variable may be generated with the aid of a closed-loop or open-loop control of the combustion position as a function of the combustion feature. In particular, the closed-loop or open-loop control of the combustion position may be accomplished using an input variable which is a function of the combustion feature and the correction value.

One idea of the above method is to generate the manipulated variable for setting the combustion in the cylinders as a function of combustion information about a quality of the combustion, in doing which, it is possible in particular to avoid negative consequences of an EGR-rate deviating too sharply upward or downward from an optimal EGR-rate, by taking the combustion information into consideration. Alternatively, the combustion information, such as the deviation from the optimal EGR-rate or, in general, the deviation from the desired air-system state, may also be obtained indirectly via information from the air-system control.

A suitable correction value may be provided, which acts upon the setpoint value (combustion-feature setpoint value), the actual value of the combustion feature to be regulated like, for example, the MFB50%$_{setpoint}$ or MFB50%$_{actual}$, or a variable generated from the setpoint value and the actual value. Thus, the combustion-position control performs a control which, given suitable combustion information, is based on a setpoint value of the combustion feature altered as a function of the correction value of the correction device.

Consequently, it is possible to adapt the combustion feature to the state of the air system in the dynamics, thus making it possible to prevent the combustion from taking place with too high a noise generation, or possibly misfiring.

The combustion information may correspond to the characteristic of the combustion-chamber pressure or be derived from it. In this context, the combustion information should include the information about the stability or the noise of the combustion.

The size of the correction value which acts upon the setpoint value of the combustion feature may be a function of the operating point and be dependent on the dynamic state of the combustion engine.

Furthermore, the combustion-position control may be accomplished as a function of a combustion-feature setpoint value and the instantaneous value of the combustion feature (actual value), the correction value acting upon the combustion-feature setpoint value.

It may be provided to add the correction value to the combustion-feature setpoint value or to multiply the combustion-feature setpoint value by the correction value.

According to further specific embodiments, the combustion information may indicate a quality of the combustion in the corresponding cylinder and may include at least one of the following data: a maximum differential heat-release characteristic, the crank-angle position of the maximum differential heat-release characteristic, a maximum value of the pressure during one working cycle, a crankshaft angle at the maximum value of the pressure, the maximum pressure gradient of the pressure characteristic caused by the combustion, the position of the above-indicated maximum pressure gradient and a burning duration of the combustion in the cylinder.

The combustion feature may be used to generate the manipulated variable with the aid of the correction value as a function of a result of a threshold-value comparison of a datum dependent on the combustion information and a setpoint value of the combustion information.

Furthermore, the correction value may be determined as a function of the operating point and/or as a function of a dynamic operation of the combustion engine.

According to one specific embodiment, in addition, an offset value may be applied to the manipulated variable for setting the combustion in the cylinders of the combustion engine, the offset value being determined as a function of the combustion information. The offset value may be added to the output of the controller and any existing precontrol, this advantageously being accomplished in such a way that the switching-in is carried out as quickly as possible and the switching-off is carried out slowly. Alternatively, the offset value may advantageously be switched in by a suitable change of internal variables of the controller, which means it is switched off automatically by the controller.

In particular, the offset value may be determined as a function of the operating point and/or as a function of a dynamic operation of the combustion engine.

Alternatively, the offset value may advantageously be switched in by a suitable change of internal variables of the controller, which means it is switched off automatically by the controller.

According to a further aspect, an engine-control unit is provided for setting a combustion in a combustion engine, particularly in a diesel engine. The engine-control unit includes:
a device for generating a manipulated variable, particularly a point of injection, as a function of a combustion feature, the combustion feature representing a condition in the cylinder, especially a pressure characteristic in the cylinder;
a device for setting the combustion in cylinders of the combustion engine with the aid of the manipulated variable; and
a correction block for providing a correction value as a function of combustion information, the combustion information supplying an indication about the quality of the combustion;
the device for generating the manipulated variable being designed to generate the manipulated variable as a function of the correction value.

According to one specific embodiment, a combustion-position control block may be provided which is designed to generate the manipulated variable with the aid of a closed-loop or open-loop control of the combustion position as a function of the combustion feature, in particular, the closed-loop or open-loop control of the combustion position being accomplished using an input variable which is a function of the combustion feature and the correction value.

In addition, the correction block may be designed to act upon the manipulated variable for setting the combustion in the cylinders of the combustion engine with an offset value, the offset value being determined as a function of the combustion information.

According to one specific embodiment, a dynamics-recognition block is provided which indicates when the combustion engine is in a dynamic operating state; when the dynamic operation ends, correction value CV is taken back in such a way that there are no sudden changes in the manipulated variable for setting the combustion in the cylinders of the combustion engine.

In one application having multiple injection, the point of injection may be corrected by shifting the complete injection pattern or parts of the injection pattern (one part here could be the pre-injection).

According to a further aspect, a computer program is provided which includes a program code that executes the above method when it is run on a data-processing unit.

In the following, specific embodiments of the present invention are explained in greater detail with reference to the attached drawings.

DETAILED DESCRIPTION

Figure 1:
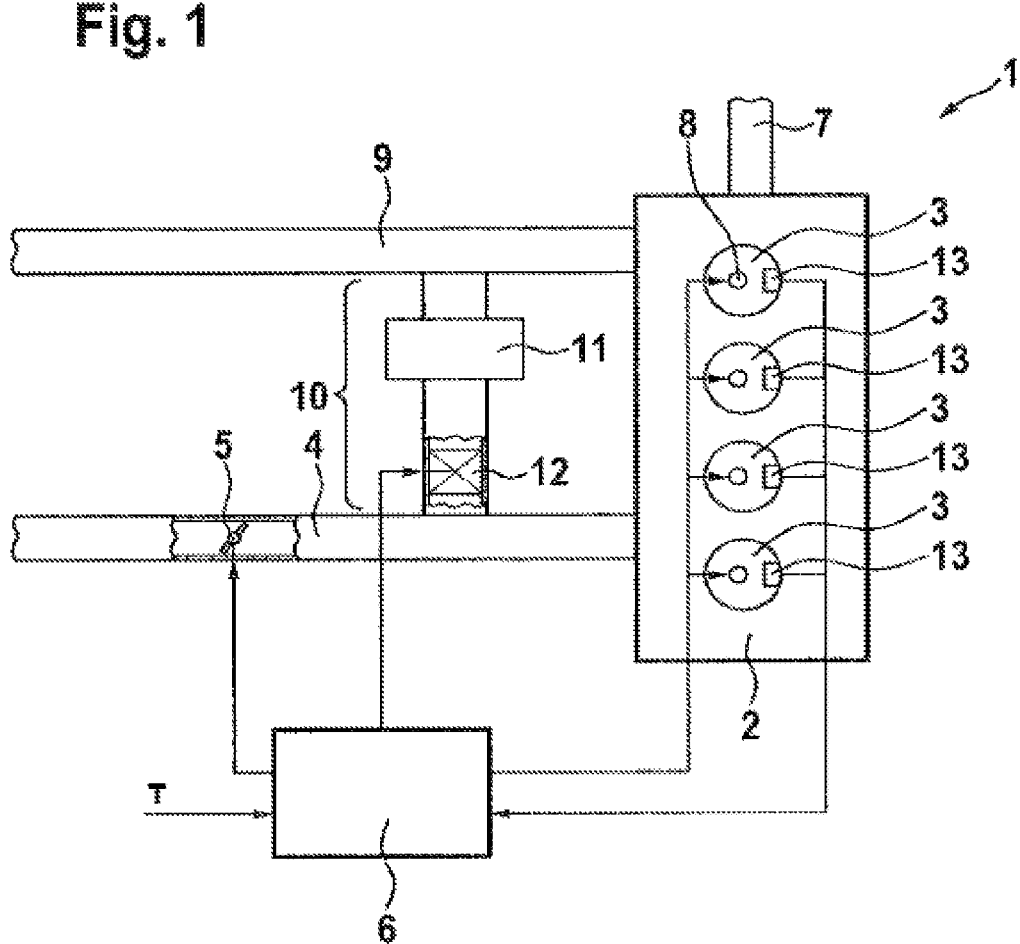
FIG. 1 shows an engine system having a combustion engine with an exhaust-gas recirculation.

FIG. 1 shows an engine system 1 having an auto-ignition combustion engine 2 such as a diesel engine, including one or more (in the case shown, four) cylinders 3. Air or an air/exhaust-gas mixture is supplied to cylinders 3 via an air-feed section 4 and via corresponding intake valves (not shown). Disposed in air-feed section 4 is a throttle valve 5 which may be adjusted by an engine-control unit 6 to control the air feed into combustion engine 2. Moreover, fuel is injected via a fuel feed 7 into cylinders 3 by way of corresponding fuel injectors 8. The point of injection and the injection period, which corresponds essentially to the quantity of fuel injected into corresponding cylinder 3, are predefined by engine-control unit 6 as a function of operating states of combustion engine 2 and of external torque demands T such as a torque required by the driver.

Combustion exhaust gases are exhausted out of cylinders 3 via corresponding exhaust valves (not shown) and carried away via an exhaust-gas section 9. In order, among other things, to optimize exhaust-gas emissions, an exhaust-gas recirculation system 10 is provided, that includes an exhaust-gas recirculation cooler 11 and an exhaust-gas recirculation valve 12. Exhaust-gas recirculation valve 12 is likewise controlled by engine-control unit 6 in order to establish an EGR-rate for the operation of combustion engine 2 via the setting of throttle valve 5 and the setting of exhaust-gas recirculation valve 12, so that, for example, the operation of combustion engine 2 is optimized according to one aspect such as engine output, exhaust-gas emissions or other aspects.

To control the combustion, provided in each of cylinders 3 are pressure sensors 13 by which the development of the cylinder pressure is measurable. Data about the cylinder-pressure characteristic thus measured is made available to engine-control unit 6. From the cylinder-pressure characteristic, engine-control unit 6 ascertains combustion information which may correspond to data about the stability or the noise of the combustion. For instance, the combustion information indicates whether the noise generation during the combustion is too high or whether the combustion is susceptible to misfirings. Furthermore, from the cylinder-pressure characteristic, engine-control unit 6 also ascertains the combustion feature which is used for the combustion-position control (here, for example, MFB50%).

A cylinder-specific control is possible when measuring the pressure in each of the cylinders. It is also possible to provide a pressure sensor in only one of the cylinders. In the case of a pressure sensor in only one of the cylinders, all cylinders are treated the same in the control, that is, it is assumed approximately that the pressure characteristic is identical in each of the cylinders.

Figure 2:
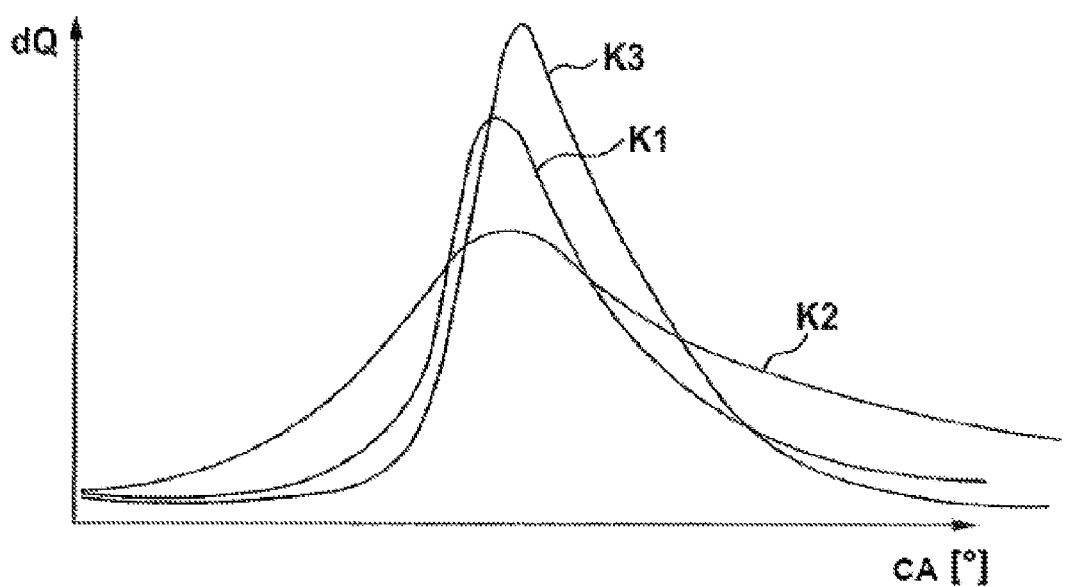
FIG. 2 shows a representation of the curve of the differential heat-release characteristic at an optimal EGR-rate, at an EGR-rate increased above the optimal EGR-rate and at an EGR-rate decreased compared to the optimal EGR-rate.
Figure 3:
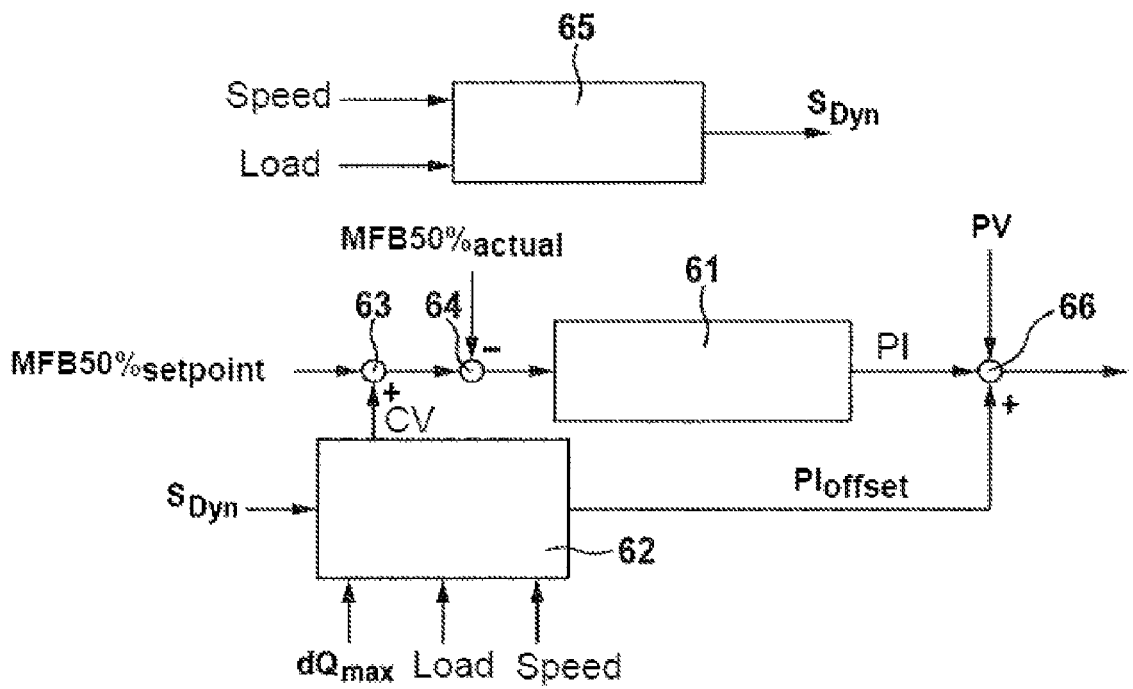
FIG. 3 shows a block representation to illustrate the device for setting the combustion position with the aid of a combustion-position control.

The maximum value of differential heat-release characteristic $dQ_{max}$ calculated from the combustion-chamber pressure characteristic may be used as suitable combustion information. Differential heat-release characteristic $dQ$ indicates the amount of energy released in each case during the combustion relative to crankshaft angle CA. Maximum differential heat-release characteristic $dQ_{max}$ indicates the maximum value of differential heat-release characteristic $dQ$ during one working cycle, and represents information with respect to the stability or noise of the combustion. This is represented illustratively in FIG. 2 with the aid of differential heat-release characteristic $dQ$ over crankshaft angle CA. Curve K1 indicates differential heat-release characteristic $dQ$ in the case of an optimal combustion, while curve K2 indicates differential heat-release characteristic $dQ$ for a combustion that is too silent and K3 indicates differential heat-release characteristic $dQ$ for a combustion that is too noisy. In the case of too silent a combustion, which is indicated by curve K2, the duration of the combustion extends over too long a period of time, while in the case of too noisy a combustion, which is indicated in curve K3, the combustion takes its course within too short a period of time compared with optimal differential heat-release characteristic $dQ$ of curve K1.

One can see that for too noisy a combustion, maximum differential heat-release characteristic $dQ_{max}$ is higher than maximum differential heat-release characteristic $dQ_{max}$ in the case of an optimal combustion, while for too silent a combustion, maximum differential heat-release characteristic $dQ_{max}$ is lower than maximum differential heat-release characteristic $dQ_{max}$ in the case of an optimal combustion. In engine-control unit 6, a combustion-position control is implemented which sets the point of injection according to the operating point of combustion engine 2, the torque T required and the combustion feature, such as MFB50%, which is ascertained from the cylinder-pressure characteristic. In order to ensure a stable combustion, the actual value of the combustion feature $MFB50\%_{Actual}$ (combustion-feature actual value) is regulated to a setpoint value of the combustion feature $MFB50\%_{Setpoint}$ (combustion-feature setpoint value), in that the point of injection is set by a combustion-position control block 61 in a manner predefined by the combustion-position control.

Since, to adjust the combustion position, point of injection PI for respective cylinder 3 is only able to be set by the combustion-position control of combustion-position control block 61 in time-delayed fashion, a correction block 62 is provided which determines a correction value CV based on the deviation of maximum differential heat-release characteristic $dQ_{max\_Actual}$, indicated by the combustion information, from the setpoint value of the maximum differential heat-release characteristic $dQ_{max\_Setpoint}$. In particular, correction value CV is determined as a function of the difference between maximum differential heat-release characteristic $dQ_{max\_Actual}$ and the setpoint value of the maximum differential heat-release characteristic $dQ_{max\_Setpoint}$. Correction value CV is then applied to combustion-feature setpoint value $MFB50\%_{Setpoint}$. In the exemplary embodiment shown, correction value CV is added to combustion-feature setpoint value $MFB50\%_{Setpoint}$ in an adder 63.

Figure 4:
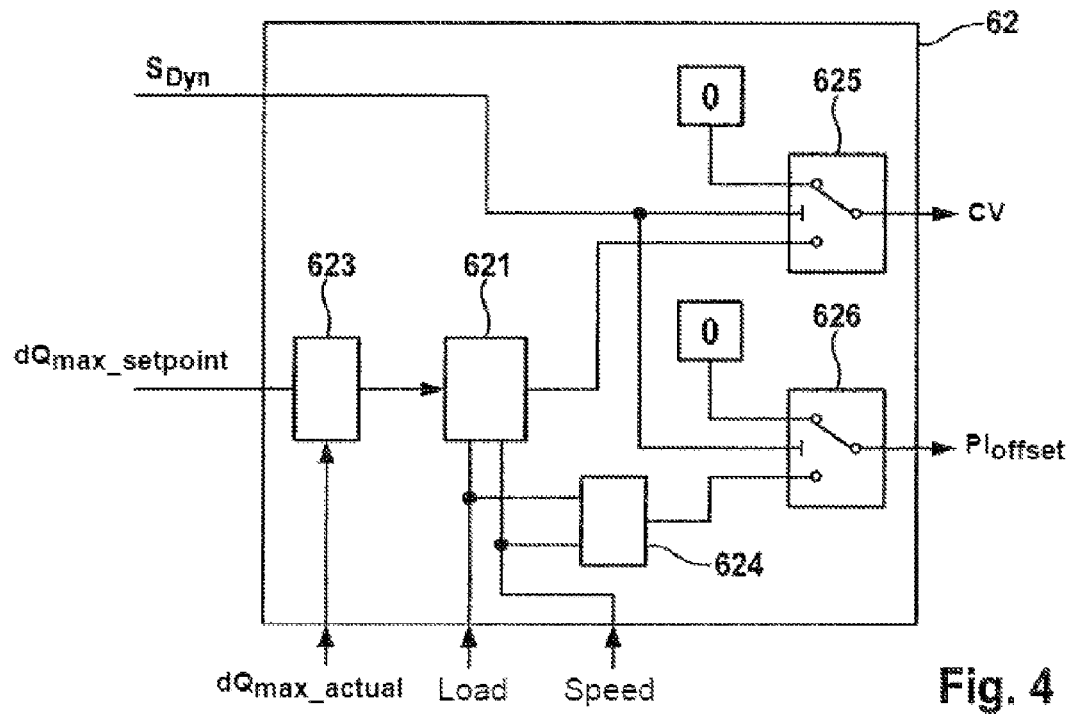
FIG. 4 shows a detailed representation of the correction block from FIG. 3.

Alternatively, correction value CV may also be provided as a correction factor by which the setpoint value of combustion feature $MFB50\%_{Setpoint}$ is multiplied. A differential value of combustion-feature setpoint value $MFB50\%_{Setpoint}$, acted upon by correction value CV, and combustion-feature actual value $MFB50\%_{Actual}$ is supplied by a subtractor 64 to combustion-position control block 61. Point of injection PI is ascertained in combustion-position control 61 as a function of the differential value. Correction block 62, shown in detail in FIG. 4, supplies a correction value CV when the deviation between maximum differential heat-release characteristic $dQ_{max\_Actual}$ and the setpoint value of maximum differential heat-release characteristic $dQ_{max\_Setpoint}$ makes up more than a specific amount. In this context, the setpoint value of maximum differential heat-release characteristic $dQ_{max\_Setpoint}$ is a function of the operating state of combustion engine 2 (in the simplest case, characterized by speed and load) and external requirements. A relevant deviation between actual value and setpoint value may be determined based on their difference, formed in a difference block 623, by a threshold-value comparison. In particular, a first threshold value S1 is assumed in the event of an actual value of maximum differential heat-release characteristic $dQ_{max\_Actual}$ which is less than the setpoint value of maximum differential heat-release characteristic $dQ_{max\_Setpoint}$ ($dQ_{max} < dQ_{max\_Setpoint}$), the risk of misfirings or unstable combustions in cylinder 3 being increased when the following applies:

$$|(dQ_{max} - dQ_{max\_setpoint})| > S1$$

If the above condition is satisfied, combustion-feature setpoint value MFB50%$_{Setpoint}$ is reduced, so that point of injection PI, which is ascertained by combustion-position control block 61, is advanced, which then leads to a smaller difference between combustion-information setpoint value dQ$_{max\_Setpoint}$ and combustion-information actual value dQ$_{max\_Actual}$.

If maximum differential heat-release characteristic dQ$_{max\_Actual}$ is greater than the setpoint value of maximum differential heat-release characteristic dQ$_{max\_Setpoint}$, then it is determined that the combustion is potentially too noisy when the following applies:

$|(dQ_{max} - dQ_{max\_setpoint})| > S2$

S2 indicating a second threshold value which may be different from first threshold value S1. In this case, combustion-feature setpoint value MFB50%$_{Setpoint}$ is increased by correction value CV, so that the combustion-position control retards the point of injection. First and second threshold values S1, S2 are taken into account in first characteristics-map block 621 in the first characteristics map.

Instead of the difference between maximum differential heat-release characteristic dQ$_{max}$ and the setpoint value of maximum differential heat-release characteristic dQ$_{max\_Setpoint}$, it is also possible to use their ratio for the threshold-value comparison.

The extent of the correction of instantaneous combustion-feature setpoint value MFB50%$_{Setpoint}$ by correction value CV may also be weighted by the amount of the difference (dQ$_{max}$−dQ$_{max\_setpoint}$) or the ratio (dQ$_{max}$/dQ$_{max\_Setpoint}$), and the weighting factor may further be a function of the operating point. For example, the operating point may be indicated by the load and the speed of combustion engine 2, and in addition, by the present operating mode.

Moreover, threshold values S1 and S2 used above may also be established by correction block 62 as a function of the operating point determined by the load and the speed.

For instance, correction block 62 may contain a first characteristics map in first characteristics-map block 621 which, as a function of data concerning the instantaneous operating point such as load and speed, and as a function of maximum differential heat-release characteristic dQ$_{max\_Actual}$, outputs a corresponding correction value CV for the setpoint value of the combustion feature to adder 63.

In order to further accelerate the reaction of the combustion-position control in engine-control unit 6 to deviations of the EGR-rate (or generally of the air system) relative to the desired value, a second adder 66 may also be provided to add a point-of-injection offset PI$_{offset}$, supplied by correction unit 62, to point of injection PI output by the combustion-position control of combustion-position control block 61. Point-of-injection offset PI$_{offset}$ is ascertained in accordance with correction value CV, e.g., with the aid of a second characteristics map in a second characteristics-map block 624, as a function of data concerning the instantaneous operating point such as load and speed and, optionally, further as a function of maximum differential heat-release characteristic dQ$_{max\_Actual}$.

Figure 5:
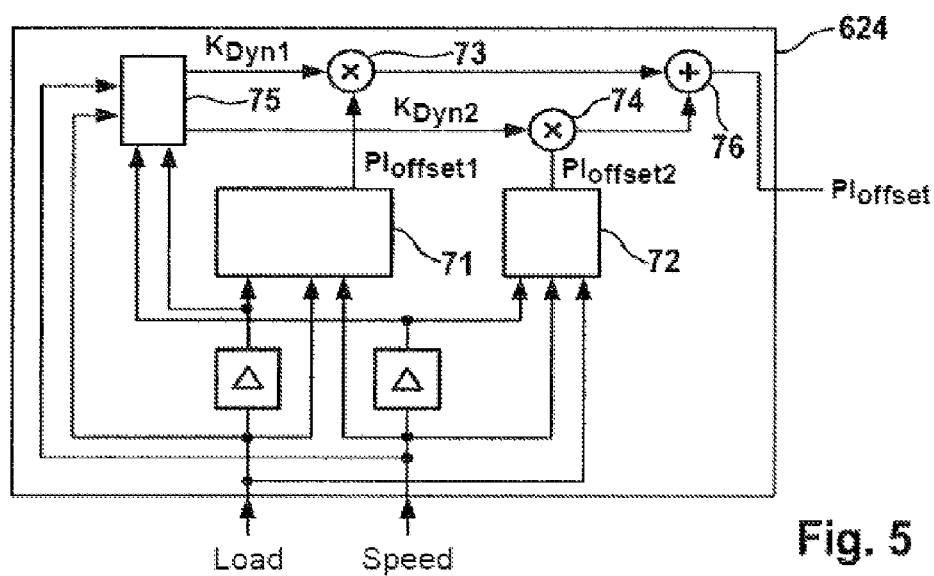
FIG. 5 shows a detailed representation of the second characteristics-map block of the correction block from FIG. 4.

The second characteristics map in second characteristics-map block 624 corresponds to a function which is described in greater detail in the following in conjunction with FIG. 5. Point-of-injection offset PI$_{offset}$ is used to take the dynamic behavior of the speed and the load into account. To that end, second characteristics-map block 624 has a first characteristics sub-map 71 and a second characteristics sub-map 72. First characteristics sub-map 71 is used to generate a first portion of point-of-injection offset PI$_{offset1}$ as a function of a load change and an operating point determined by load and speed. In an analogous manner, second characteristics sub-map 72 is used to generate a second portion PI$_{offset2}$ as a function of a change in speed and as a function of the operating point determined by load and speed. The portions of point-of-injection offset PI$_{offset1}$, PI$_{offset2}$ may be generated depending upon whether the load change or the speed change exceeds a specific corresponding threshold value.

Using the two characteristics sub-maps 71, 72, it is possible to take into account the effects that, with increasing load, the maximum pressure gradient rises, while it likewise falls as the load declines, the maximum pressure gradient dropping in response to increasing speed and increasing in response to declining speed. If the maximum pressure gradient exceeds or drops below the setpoint value effective in the operating point, the combustion-position control intervenes in the point of injection in the retard or advance direction. In the case of a control of combustion position MFB50%, the intervention is carried out accordingly, so that depending on the pressure gradient, a combustion position which is too retarded is intended to be brought to a more advanced injection of fuel, and too advanced a combustion position is intended to be brought to a more retarded injection of fuel. However, for reasons of stability, the combustion-position control cannot be applied so quickly that it is possible to avoid noise peaks and delayed combustions in response to great deviations in the air system. Therefore, for a certain period, the maximum pressure value remains, for example, at too high a level, so that an integration component builds up in the combustion-position control, which may take effect in the form of delayed combustions all the way to misfirings.

These dynamic effects are recognized due to the provision of characteristics sub-maps 71, 72. Characteristics sub-maps 71, 72 are implemented in such a way that a point-of-injection offset is switched in as a function of dynamics when, for example, in response to increasing load, the start of injection is retarded, in order to avoid the noise peak. The buildup of an excessive integration component in the combustion-position control may thereby be avoided.

Characteristics sub-maps 71, 72 also assure that, in response to decreasing dynamics, the corresponding portions of the point-of-injection offset are withdrawn, so that a stable combustion is ensured.

Characteristics sub-maps 71, 72 take into account the change in load and the change in speed, respectively, which are yielded from a differential value of the load of the instantaneous working cycle and the previous working cycle, or the speed of the instantaneous working cycle and the previous working cycle.

In order to avoid rapid changes in the point-of-injection offset, the load change or speed change may be ascertained over several working cycles.

The first portion of point-of-injection offset PI$_{offset1}$ is supplied to a first multiplication block 73, and the second portion of point-of-injection offset PI$_{offset2}$ is supplied to a second multiplication block 74. In addition, a dynamics factor K$_{Dyn1}$, K$_{Dyn2}$ is supplied by a dynamics-factor block 75 to first and second multiplication blocks 73, 74, respectively. Dynamics-factor block 75 generates dynamics factors K$_{Dyn1}$, K$_{Dyn2}$ with which the preceding sign of the consideration of the point of injection may be determined. In addition, due to the different form of dynamics-correction factors K$_{Dyn1}$, K$_{Dyn2}$, in the case of a dynamics-dependent correction based both on the speed and on the load, a prioritization may be carried out, so that in the event the speed and the load change at the same time, essentially only one or mainly only one of characteristics sub-maps 71, 72 becomes effective. In this way, an overcompensation may be prevented. The results of the weighted portions of point-of-injection offset $PI_{offset1}$, $PI_{offset2}$ are added in an adder 76, and the sum of the portions of point-of-injection offset $PI_{offset1}$, $PI_{offset2}$ are output as point-of-injection offset $PI_{offset}$. One can see that due to dynamics-correction block 75, by variation of dynamics-correction factors $K_{Dyn1}$, $K_{Dyn2}$, the action of point-of-injection offset $PI_{offset}$ on the point of injection may be switched off more slowly than switched in. To that end, the changes of the load change and the speed change as well as the instantaneous operating point, which is indicated by the load and the speed, may be taken into account in dynamics-correction block 75.

Moreover, a precontrol value PV may be added to point of injection PI with the aid of second adder 66, precontrol value PV being used to keep deviations between the setpoint value of combustion feature $MFB50\%_{Setpoint}$ and the actual value of combustion feature $MFB50\%_{Actual}$ small, so that the control only has to compensate for smaller deviations.

The first and the second characteristics maps may be determined empirically, or the two characteristics maps may be replaced by physical models which physically simulate the engine system.

The extent of the correction of the points of injection by point-of-injection offset $PI_{offset}$ may also be weighted by the amount of the difference ($dQ_{max} - dQ_{max\_Setpoint}$) or the ratio ($dQ_{max}/dQ_{max\_Setpoint}$), and moreover, the weighting factor may be a function of the operating point. For instance, the operating point may be indicated by the load and the speed of combustion engine 2.

In addition, a dynamics-recognition block 65 may be provided which outputs a status bit $S_{Dyn}$ that indicates when combustion engine 2 is in a dynamic operating state, that is, in an operating state in which speed and/or load change significantly. For instance, the dynamic operating state is recognized when the amount of the gradient of the change is greater than a specific dynamics threshold value.

Correction block 62 may either exercise the correction function independently of the operating state of combustion engine 2 indicated by status bit $S_{Dyn}$, or depending upon whether status bi. $S_{Dyn}$ indicates a dynamic operation of combustion engine 2. During steady-state operation or operation with only low dynamics, only slight deviations can be expected in the EGR-rate, so that in this operational case, the combustion-position control and the air-system control are sufficient to prevent an unwanted operating state. In this case, the application of correction value CV may also be omitted.

To put the dependency of the provision of correction value CV and of point-of-injection offset $PI_{offset}$, respectively, into practice, a first and a second switching unit 625, 626 may be provided. As a function of the dynamics recognition of stability bit $S_{Dyn}$, first switching unit 625 outputs either correction value CV, made available by first characteristics-map block 621, via the output of correction block 62, or the value 0 if there is no or only a low dynamic operation of the combustion engine. Analogously, second switching unit 626 selects point-of-injection offset $PI_{offset}$, which is made available by second characteristics-map block 624, or the value 0 as a function of status $S_{Dyn}$. In this manner, it is possible to put into practice the fact that interventions into the combustion-position control are carried out only in response to a state of dynamic operation, and otherwise, because a correction value and a point-of-injection offset of 0 are output, an intervention does not occur.

If the use of the correction function of correction block 62 is dependent on status bit $S_{Dyn}$ of dynamics-recognition block 65, it may further be provided that, upon termination of the dynamic operation, which is indicated by a change in the level of status bit $S_{Dyn}$, correction value CV is taken back in such a way that no sudden changes occur in the setting of point of injection PI; for example, as a function of the change in the level of status bit $S_{Dyn}$, correction value CV may be returned in ramp-shaped fashion or step-by-step to the value 0 within a predetermined time. Alternatively, the correction value or controller-internal variables may also be canceled without provision of a transition function.

Instead of maximum differential heat-release characteristic $dQ_{max}$, as an alternative, it is also possible to use other features such as the peak pressure which is caused by the combustion, that is, the maximum value of the pressure during one working cycle, the position of the peak pressure (crankshaft angle), the maximum pressure gradient of the pressure characteristic which is caused by the combustion, the crank-angle position of the maximum pressure gradient, the crank-angle position of maximum differential heat-release characteristic $dQ_{max}$ or the burning duration (which, for example, may be indicated by the difference between MFB90% and MFB10%) as combustion information. A variable substantially influencing the combustion, such as the deviation of the EGR-rate from a setpoint EGR-rate, or the deviation of the state of the air-system variables relative to the air-system setpoint variables may also be used as indirect combustion information. Furthermore, a combination of features may also be advantageous, in order to ascertain a suitable correction value CV for acting on combustion-feature setpoint value $MFB50\%_{Setpoint}$.

What is claimed is:

1. A method for setting a combustion in a combustion engine, the method comprising:
   generating a manipulated variable as a function of a combustion feature (MFB50%), the combustion feature (MFB50%) representing a condition in cylinder; and
   setting the combustion in cylinders of the combustion engine with the aid of the manipulated variable;
   the manipulated variable being generated as a function of a correction value (CV), which is determined as a function of combustion information ($dQ_{max}$) that provides an indication about the quality of the combustion.

2. The method of claim 1, wherein the manipulated variable is generated as a function of the combustion feature (MFB50%) with the aid of a closed-loop or open-loop control of the combustion position.

3. The method of claim 2, wherein the closed-loop or open-loop control of the combustion position is accomplished using an input variable, which is a function of the combustion feature (MFB50%) and the correction value (CV).

4. The method of claim 2, wherein the combustion-position control is accomplished as a function of a combustion-feature setpoint value ($MFB50\%_{Setpoint}$) and the combustion feature (MFB50%), the correction value (CV) acting upon the combustion-feature setpoint value ($MFB50\%_{Setpoint}$).

5. The method of claim 4, wherein the correction value (CV) is added to the combustion-feature setpoint value ($MFB50\%_{Setpoint}$) or the combustion-feature setpoint value ($MFB50\%_{Setpoint}$) is multiplied by the correction value (CV).

6. The method of claim 1, wherein, in addition, the manipulated variable (PI) for setting the combustion in the cylinders of the combustion engine is acted upon by an offset value ($PI_{offset}$), the offset value ($PI_{offset}$) being determined as a function of the combustion information ($dQ_{max}$).

7. The method of claim 6, wherein the offset value ($PI_{offset}$) is determined as a function of the operating point and/or as a function of a dynamic operation of the combustion engine.

8. The method of claim 1, wherein the combustion information ($dQ_{max}$) at least one of indicates a quality of the combustion in the corresponding cylinder, and contains at least one of the following data: a maximum differential heat-release characteristic, a crankshaft angle of the maximum differential heat-release characteristic, a maximum value of the pressure during one working cycle, a crankshaft angle of the maximum value of the pressure, a maximum pressure gradient of the pressure characteristic which is caused by the combustion, a crankshaft angle at the maximum pressure gradient of the pressure characteristic and a burning duration of the combustion in the cylinder.

9. The method of claim 1, wherein the manipulated variable is generated with the aid of the correction value (CV) as a function of a result of a threshold-value comparison of a datum dependent on the combustion information ($dQ_{max}$) and a setpoint value of the combustion information ($dQ_{max\_Setpoint}$).

10. The method of claim 1, wherein the correction value (CV) is determined at least one of as a function of the operating point, and as a function of a dynamic operation of the combustion engine.

11. The method of claim 1, wherein the correction value (CV) is determined at least one of with the aid of a predefined characteristics map, and with the aid of at least one predefined physical equations.

12. An engine-control unit for setting a combustion in a combustion engine, comprising:
   a generating device for generating a manipulated variable as a function of a combustion feature (MFB50%), the combustion feature (MFB50%) representing a condition in the cylinder;
   a setting device for setting the combustion in cylinders of the combustion engine with the aid of the manipulated variable; and
   a correction block for providing a correction value (CV) as a function of combustion information (dQmax), the combustion information (dQmax) supplying an indication about the quality of the combustion;
   the device for generating the manipulated variable being configured to generate the manipulated variable as a function of the correction value (CV).

13. The engine-control unit of claim 12, further comprising:
   a combustion-position control block which is configured to generate the manipulated variable with the aid of a closed-loop or open-loop control of the combustion position as a function of the combustion feature (MFB50%), the closed-loop or open-loop control of the combustion position being accomplished using an input variable which is a function of the combustion feature (MFB50%) and the correction value (CV).

14. The engine-control unit of claim 12, wherein the correction block is configured to act upon the manipulated variable for setting the combustion in the cylinders of the combustion engine with an offset value ($PI_{offset}$), the offset value ($PI_{offset}$) being determined as a function of at least one of the combustion information ($dQ_{max}$), speed dynamics, and load dynamics.

15. The engine-control unit of claim 12, further comprising:
   a dynamics-recognition block to indicate when the combustion engine is in a dynamic operating state, and which is configured so that, upon termination of the dynamic operation, the correction value (CV) is taken back so that there are no sudden changes in the manipulated variable for setting the combustion in the cylinders of the combustion engine.

16. A computer readable medium having a computer program, which is executable by a processing unit, comprising:
   a program code arrangement having program code for setting a combustion in a combustion engine, by performing the following:
      generating a manipulated variable as a function of a combustion feature (MFB50%), the combustion feature (MFB50%) representing a condition in cylinder; and
      setting the combustion in cylinders of the combustion engine with the aid of the manipulated variable;
   the manipulated variable being generated as a function of a correction value (CV), which is determined as a function of combustion information ($dQ_{max}$) that provides an indication about the quality of the combustion.

17. The method of claim 1, wherein the combustion engine is a diesel engine, wherein the manipulated variable is a point of injection (PI), and wherein the condition in the cylinder is a pressure characteristic in the cylinder.

18. The engine-control unit of claim 12, wherein the combustion engine is a diesel engine, wherein the manipulated variable is a point of injection (PI), and wherein the condition in the cylinder is a pressure characteristic in the cylinder.

* * * * *